(12) United States Patent
Smedberg et al.

(10) Patent No.: US 9,406,082 B2
(45) Date of Patent: Aug. 2, 2016

(54) MULTIPLEXING WEB REQUESTS FOR IMPROVED PERFORMANCE

(71) Applicant: REDFIN Corporation, Seattle, WA (US)

(72) Inventors: Michael Smedberg, Seattle, WA (US); Sasha Aickin, Seattle, WA (US); Shahaf Abileah, Seattle, WA (US); Jason Brackins, Seattle, WA (US)

(73) Assignee: Redfin Corporation, Seattle, WA (US)

( * ) Notice: Subject to any disclaimer, the term of this patent is extended or adjusted under 35 U.S.C. 154(b) by 249 days.

(21) Appl. No.: 13/907,632

(22) Filed: May 31, 2013

(65) Prior Publication Data
US 2014/0101235 A1   Apr. 10, 2014

Related U.S. Application Data (60) Provisional application No. 61/710,606, filed on Oct. 5, 2012.

(51) Int. Cl.
| | |
|---|---|
| G06F 15/16 | (2006.01) |
| G06Q 30/06 | (2012.01) |
| G06Q 50/16 | (2012.01) |
| G06Q 10/10 | (2012.01) |
| H04L 29/06 | (2006.01) |
| G06Q 30/02 | (2012.01) |
| G06F 17/22 | (2006.01) |
| H04W 4/02 | (2009.01) |
| G06F 17/30 | (2006.01) |

(52) U.S. Cl.
CPC ........ *G06Q 30/0613* (2013.01); *G06F 17/2235* (2013.01); *G06F 17/2247* (2013.01); *G06F 17/30* (2013.01); *G06Q 10/1095* (2013.01); *G06Q 30/0257* (2013.01); *G06Q 30/0623* (2013.01); *G06Q 50/16* (2013.01); *H04L 67/42* (2013.01); *H04W 4/028* (2013.01)

(58) Field of Classification Search
USPC ......................................................... 709/203
See application file for complete search history.

(56) References Cited

U.S. PATENT DOCUMENTS

| | | | | | |
|---|---|---|---|---|---|
| 6,799,166 B2 * | 9/2004 | Dorrance | ............... | G06Q 40/00 | 705/35 |
| 6,820,133 B1 * | 11/2004 | Grove | ............... | H04L 29/12066 | 709/238 |
| 8,762,416 B1 * | 6/2014 | Corbett | ................. | G06F 3/0614 | 707/796 |

(Continued)

*Primary Examiner* — Ario Etienne
*Assistant Examiner* — Sahera Halim
(74) *Attorney, Agent, or Firm* — PG Scott Born; Richard Thomas Black; Foster Pepper PLLC (57) ABSTRACT

A request multiplexing system is described herein that takes multiple asynchronous requests from a client to multiple server endpoints and multiplexes the requests at the client into a single request to a new server endpoint. The new endpoint demultiplexes the requests at the server, calls the pre-existing separate endpoints to get the correct response for each request, combines the responses into a single multiplexed response, and returns the combined response to the client. On the client side, the response data is split up and handed to the appropriate handlers. From the components' points of view and those of the endpoints on the server, the requests occur just as they originally may. However, new logic on both the client and the server has packaged and unpackaged requests and responses appropriately to accomplish without component modification what formerly involved extensive coordination between developers of various components.

10 Claims, 6 Drawing Sheets

(56) References Cited

U.S. PATENT DOCUMENTS

2002/0042839 A1* 4/2002 Peiffer .................... H04L 29/06
709/238

2011/0066676 A1* 3/2011 Kleyzit ............. G06F 17/30902
709/203

2013/0227056 A1* 8/2013 Vecera .................... H04L 67/02
709/217

* cited by examiner

MULTIPLEXING WEB REQUESTS FOR IMPROVED PERFORMANCE

PRIORITY CLAIM

The present application claims priority from U.S. Provisional Application No. 61/710,606, filed Oct. 5, 2012, which is incorporated by reference as if fully set forth herein.

BACKGROUND OF THE INVENTION

Most modern, dynamic web pages make numerous asynchronous JavaScript and extensible markup language (XML) (AJAX) calls from a client to retrieve content from a server. An AJAX call is hypertext transport protocol (HTTP) request initiated by client side code (typically JavaScript) that returns data to be rendered into the page. For example, a page describing a product for sale might initially display generic content about the product, which can be heavily cached and delivered to the user very quickly. Shortly thereafter, the page may be asynchronously updated with personalized content that is specific to the user, such as the user's viewing history (e.g., "you're looking at product B, but you last looked at product A".) The personalized content is delivered via an AJAX call to give the user a fast and efficient experience.

A complex dynamic web page may include many personalizations or other customizations. In addition, modern web applications are so large that they may be worked on by very large software teams, such that the personalizations and customizations may be implemented by numerous developers. Because it is uncommon for such large teams to be able to communicate perfectly, this can result in numerous AJAX calls that may occur in parallel or may be serialized. The multiplicity of AJAX calls can adversely affect performance. In particular, serialization of AJAX calls on networks with high latency can create very poor perceived performance because each request cannot be sent (and thus a response cannot be received) until the previous request completes.

The standard solution to this problem is to reconfigure page logic to combine requests. For instance, suppose developer Ann writes code that requests personalization data X, and developer Burt writes code that requests personalization data Y. Performance could be improved by rewriting the code written by Ann and Burt. In a typical instance, the server would be updated to include an endpoint that will return information X and Y. The code written by Ann and Burt would be rewritten to perform a single AJAX request that uses the new endpoint. The new code would extract data X from the response and invoke Ann's code, and extract data Y from the response and invoke Burt's code. This works, but involves a substantial rewrite of code at significant expense and also entails an unrealistic level of coordination between developers and teams.

DETAILED DESCRIPTION

Embodiments of the invention may be operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and non-volatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

A request multiplexing system is described herein that takes multiple AJAX requests to multiple endpoints and multiplexes the requests at the client into a single AJAX request to a new endpoint. For example, a request from component A for data X may be packaged together with a request from component B for data Y. This can occur automatically without any coordination involved between the developers for component A and component B. The new endpoint demultiplexes the requests at the server, calls the pre-existing separate endpoints to get the correct response for each request, combines the responses into a single multiplexed response, and returns the combined response to the client.

Using the previous example, the combined request for X and Y reaches the server, where the server unpackages the combined request, sends the request for X to the original endpoint for that purpose, sends the request for Y to the original endpoint for that purpose, and waits for the response to both to send a combined response to the client. On the client side, the response data is split up and handed to the appropriate response handlers. Note that from the components' points of view and those of the endpoints on the server, the requests occur just as they originally would. However, new logic on both the client and the server has packaged and unpackaged requests and responses appropriately to accomplish without component modification what formerly involved extensive coordination between developers. Thus, the request multiplexing system provides client side multiplexing of multiple requests and server side demultiplexing of requests to allow reuse of existing, distinct endpoints with minimal changes to code needed to consolidate AJAX requests. In addition, the system can group AJAX requests into batches with similar characteristics (e.g., performance or other characteristics).

The request multiplexing system includes two distinct software pieces. On the client side (i.e., in a web browser), a JavaScript library makes it easy to combine multiple AJAX requests and to apportion out the response data to the appropriate handlers. On the server side, a new endpoint is added for the handling of multiplexed requests, which invokes the relevant original endpoints, gathers responses, and packages them into a single response. In this way, it is possible to continue using the old endpoints, and to leverage the new multiplexed endpoint when it is useful or more efficient.

The client side code includes a new library that is invoked when an AJAX requests is desired. Code that previously made AJAX requests directly can be updated to make calls to the library instead. The library is optionally designed to closely resemble the method that was previously used to make AJAX requests to make integration easy. As an example, for a web application that was previously using the third-party Dojo library to make AJAX requests, the new code described for implementing the system herein can be made to seem very similar to Dojo (and this could be done for other libraries as well).

Traditionally, client side code invokes an AJAX request by supplying the uniform resource locator (URL) of a server side endpoint, and a handler function to be invoked when the data is available (i.e., when the asynchronous response arrives). Upon receiving the request, the browser may start an HTTP request as soon as reasonable, and invoke the handler when the HTTP request is complete.

When using the request multiplexing system, the same arguments previously passed to the endpoint are instead provided to the client-side software library. In some embodiments, one or more additional arguments may be provided, such as the name of a batch for grouping requests. The system may not start the HTTP request immediately. Instead, the system may wait while other code adds additional requests to the queue. Once all requests have been specified, client code may indicate to the system that it can proceed, at which time the system may combine all of the request information into a single HTTP request. In some embodiments, the system may leverage a timer or other indication to automatically determine when to submit the batched requests. Implementers of the system can configure this aspect to their particular goals. A longer wait until submitting the request may result in more batching but also a longer latency for the original request to be satisfied (because the time items wait in the queue adds to the user-perceived response time). The client side library provides a handler for processing the batched response. The response handler examines the response data, breaks out the data for each individual original request, and invokes the underlying handlers.

Figure 1:
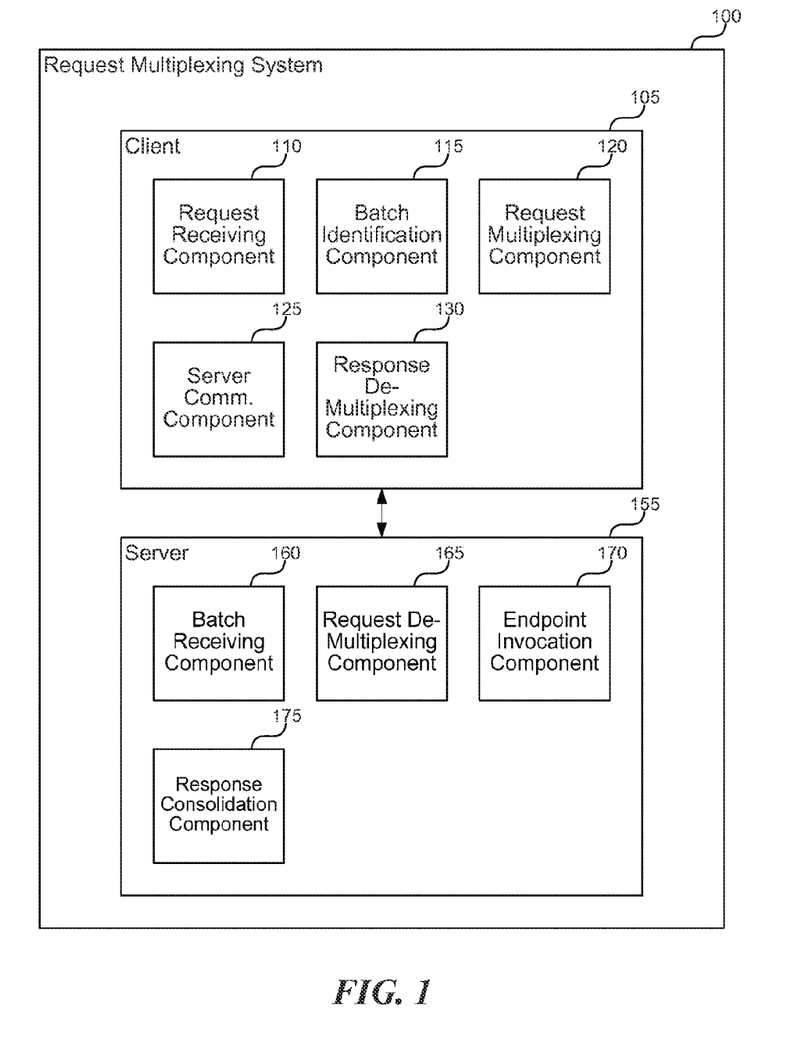
FIG. 1 is a block diagram that illustrates components of the request multiplexing system, in one embodiment.

FIG. 1 is a block diagram that illustrates components of the request multiplexing system, in one embodiment. The system 100 includes a client component 105 and a server component 155. The client component 105 includes a request receiving component 110, a batch identification component 115, a request multiplexing component 120, a server communication component 125, and a response demultiplexing component 130. The server component 155 includes a batch receiving component 160, a request demultiplexing component 165, an endpoint invocation component 170, a response consolidation component 175, and a client communication component 180. Each of these components is described in further detail herein.

The request receiving component 110 operates at a client computer to receive a request from a subcomponent of a web=based application. For example, a web page that includes various types of client-side scripting such as JavaScript may include a request to retrieve data from a server associated with the web-based application. In some embodiments, the request is an asynchronous request, such as an AJAX-based request, that can occur in the background while a user is interacting with the web page. The component 110 receives the request through a direct call, through a call to a software library, or via another software facility. The request may include information such as a URL or other endpoint of the server that identifies a type or purpose of the request, one or more arguments or parameters related to the request, a function to call when a response is received, and other information such as a batch group identifier for allowing the caller to influence how particular requests are batched together. The request may include other configurable information, such as how long the caller is willing to wait for a batch to be created (i.e., how long the request can be held) before the request is sent to the server.

The batch identification component 115 identifies a batch with which to associate the received request for multiplexing multiple requests in a single request transmitted to the server. The component 115 may identify batches according to many different schemes, depending on the goals of any particular implementation of the system 100. For example, the component 115 may receive a batch identifier from each caller that submits requests, and then batch together those requests that have a matching batch identifier. As another example, the system may automatically determine which requests to batch together, based on timeliness with which the caller requests a response, a threshold allowed wait time, considerations of scalability of the server, and so forth.

The request multiplexing component 120 creates a new multiplexed request that includes each of multiple received requests identified for batching by the batch identification component 115. The multiplexed request includes the data from each of the requests, as well as any overhead used for separating and identifying the separate requests (e.g., header information, markers between requests, and so forth). The server uses this information to separate the multiplexed request into its original component pieces for processing by various separate endpoints at the server. The request multiplexing component may include an interface for receiving an instruction at the client to submit a batch of waiting requests or may automatically determine when to submit a batch (e.g., based on a timer). For example, the request multiplexing component 120 may include a "Push" or "Flush" function, that may send any waiting requests (or only waiting requests from an identified batch) when it is called. In some embodiments, the request multiplexing component 120 operates in a manner such that requestors need not know or modify their actions to send requests individually or in batches. In other words, the system 100 may operate transparently or with a low amount of modification to existing client software code.

The server communication component 125 handles communication of the multiplexed request over the network. The communication may include placing the multiplexed request in a particular format for a particular protocol, sending the formatted message over the network, and receiving any response. For example, the component 125 may place the multiplexed request in the form of an HTTP POST, and submit the POST to the server using TCP or another protocol, which is also used to receive any response. The server communication component 125 may also handle any errors, such as a failure to reach the server, a timeout in the connection, retransmission of lost packets, and so forth.

The response demultiplexing component 130 divides a received response from the server into individual responses to each of the batched original requests. Just as the client sends multiple requests in a batch to the server, the server may return responses to those requests in a batch. The response demultiplexing component's 130 job is then to unpack the batched responses and to provide each individual response to the original submitter of the associated request. In some embodiment, the component 130 invokes a response handler provided by the requester with the request, and provides each individual response in the received response as an argument or parameter to the appropriate response handler. The received response may include header or other information that provides information to the client describing how to separate the various responses. For example, a header may provide a count of fixed size responses or a pointer to the start of each variable sized response. Alternatively, the response may include markers that inherently divide the responses, such as a response in XML format that includes a hierarchical separation in the text of the responses by embedded tags.

The batch receiving component 160 provides a server batch endpoint at which to receive a type of batch request that includes multiple multiplexed separate requests from the client. The endpoint may be provided in addition to original individual endpoints that can continue to service individual requests that are not batched, and batched individual requests once they are separated out. The batch endpoint includes logic for separating the individual requests, and invokes the request demultiplexing component 165 to identify each request. The batch receiving component 160 may also track which requests were received together and oversee the process of obtaining responses to each request, so that a batch response can be sent to the client after all of the individual responses are collected.

The request demultiplexing component 165 separates the multiple multiplexed separate requests from the received batch request. The component 165 may use header or other separating information to identify each separate request, as well as to identify information needed for responding to each separate request. For example, each request may include information identifying an endpoint for handling the request, arguments or parameters associated with the request, and so forth. The component 165 then invokes the endpoint invocation component to pass each request to the appropriate endpoint for handling.

The endpoint invocation component 170 invokes individual endpoints that are not the batch endpoint for handling each separate request form the received batch request. The individual endpoints are typically endpoints that existed for handling separate client calls to perform various actions before the introduction of the request multiplexing system 100, but may also include hidden or other request handling endpoints that are not otherwise publicly exposed. The endpoint invocation component 170 may invoke the separate endpoints serially, in parallel, or according to other schemes to balance low latency and high performance with other considerations such as server scalability. For example, the component 170 may send off several separate requests to be processed at the same time, and then batch up the responses when the responses are received from the individual endpoints.

The response consolidation component 175 batches responses from the invoked individual endpoints to create a batch response for sending to the client in response to the batch request. As other batches described herein, the batch response includes header or other information for defining the separation of individual responses, so that the client can provide each response to an appropriate originating subcomponent. The process of batching requests at the client and responses at the server can be added on to existing client and server logic so that underlying subcomponents on the client and endpoints on the server do not have to be modified substantially to take advantage of the improved responsiveness gained by batching requests. Thus, the system 100 alleviates a high need for coordination among owners of various subcomponents of a web-based application and allows a web-based application to evolve with new features in a standard way over time while still providing performance advantages.

The client communication component 180 handles communication with the client, including the receiving of batch requests and the sending of batch responses over the network. The communication may include placing the batch response in a particular format for a particular protocol, sending the formatted message over the network, and receiving any response. For example, the component 180 may place the batch response in the form of an HTTP 200 OK response with accompanying data, and submit the response to the client using TOP or another protocol, which is also used to receive any response. The client communication component 180 may also handle any errors, such as a failure to reach the client, a timeout in the connection, retransmission of lost packets, and so forth.

Figure 2:
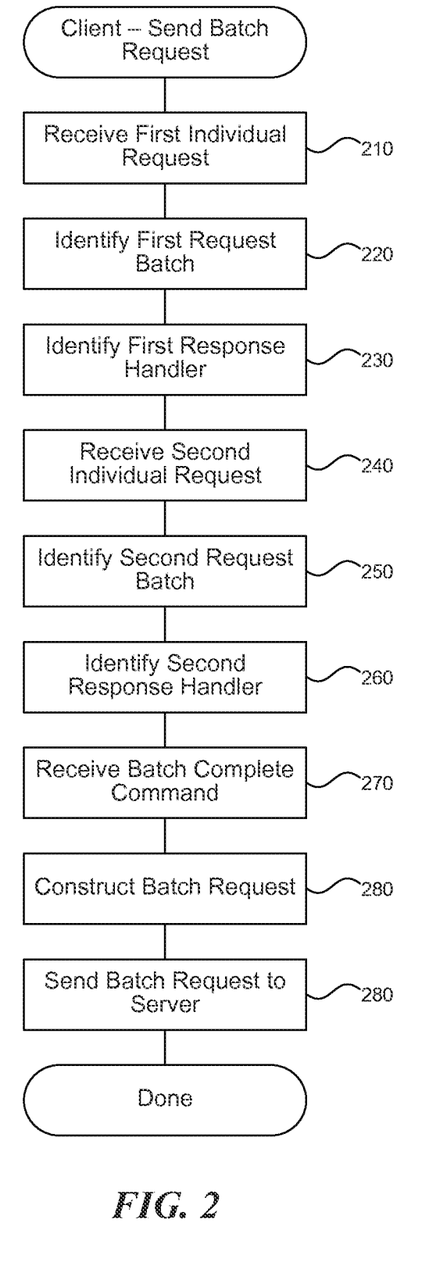
FIG. 2 is a flow diagram that illustrates processing of the request multiplexing system to send a multiplexed request at the client, in one embodiment.

FIG. 2 is a flow diagram that illustrates processing of the request multiplexing system to send a multiplexed request at the client, in one embodiment. Beginning in block 210, the system receives at a client a first individual request that specifies an asynchronous request for data from a server. The system receives the request via a call to a client side function or other software based input at the client. The request identifies an endpoint at the server that is capable of separately handling the client request to provide a response. However, rather than immediately send the request as may traditionally be done at the client, the system instead places the request in a queue of requests to be sent in a batch to the server. The system thereby reduces potentially dozens of requests going out from the client and any wait from delays in any one of the requests (where requests are handled serially, for example).

Continuing in block 220, the system determines a batch identifier associated with the first request, wherein the batch identifier provides input describing a type of other requests with which the first request is suitable for batching. The type may include those requests that have similar purposes, similar latency characteristics, emanate from a similar client side component, or other groupings desirable for any particular implementation of the system. The batch identifier may include a text string, numeric identifier, globally unique identifier (GUID), or any other identifier for identifying the requested batch.

Continuing in block 230, the system identifies a first response handler associated with the first request, to be invoked upon the receiving of a response to the first request. The response handler may include a function name or other reference that identifies a function or other software associated with the request identified for handling responses to that request. The system stores the requested handler at the client or alternatively may include handler information in the request so that it can be passed back in the response. Upon receiving a batch response, the system invokes individual handlers associated with the original requests, described further with reference to FIG. 3.

Continuing in block 240, the system receives a second individual request that specifies an asynchronous request for data from the server. Like the first request, the second request is received via a call to a client side function (e.g., through a software library). The request identifies an endpoint at the server that is capable of separately handling the client request to provide a response. However, rather than immediately send the request as may traditionally be done at the client, the system instead places the request in a queue of requests along with the first request to be sent in a batch to the server.

Continuing in block 250, the system determines a second batch identifier associated with the second request, wherein the second batch identifier provides input describing a type of other requests with which the second request is suitable for batching. In some cases, the second batch identifier matches the first batch identifier and the first and second request are placed into the same batch for transmission to the server. In other cases, the identifiers may be different such that the requests are placed in separate batches. In many web applications, there are different types of server requests that can be grouped according to favorable characteristics, such as time it takes to process the request, importance of the request to a smooth user interface for the user, acceptable latency for receiving a response to the request, and so forth.

Continuing in block 260, the system identifies a second response handler associated with the second request, to be invoked upon the receiving of a response to the second request. The response handler may include a function name or other reference that identifies a function or other software associated with the request identified for handling responses to that request. The system stores the requested handler at the client or alternatively may include handler formation in the request so that it can be passed back in the response. Upon receiving a batch response, the system invokes individual handlers associated with the original requests, described further with reference to FIG. 3. The system may receive additional requests (for a variety of batches) before sending a batch to the server, though only two are shown here for clarity and simplicity of the explanation of the operation of the system. Those of ordinary skill in the art will recognize the extension of the principles discussed herein to the handling of greater numbers of requests in batches.

Continuing in block 270, the system receives an indication that a batch is complete and is ready for sending to the server. The system may receive the indication manually, such as through client-side software code that calls a "Flush" or other command to indicate that a queued batch or batches are complete. The system may also receive the indication automatically, such as by the expiration of a timer for waiting for requests to batch. Regardless of how the indication is received, at the time it is received the system prepares to carry out the transmission of the batch to the server.

Continuing in block 280, the system constructs a batch request that includes the received first request and second request. The batch request includes header or other separating information that allows each individual request within the batch to be identified by the server. In addition, the batch request includes endpoint information describing which server endpoint or endpoints will handle each request in the batch. The batch request is itself an asynchronous call to the server using a batch endpoint that the server provides for handling batch requests.

Continuing in block 290, the system sends the batch request to the server via a server batch endpoint. The sending may include wrapping the request in the format of a particular protocol, such as HTTP or XML, for transmission to the server using a particular transmission protocol, such as TCP. The system sends the batch request to the server using the selected format and transmission protocol, then waits for a response from the server as described further with reference to FIG. 3. After block 290, these steps conclude.

Figure 3:
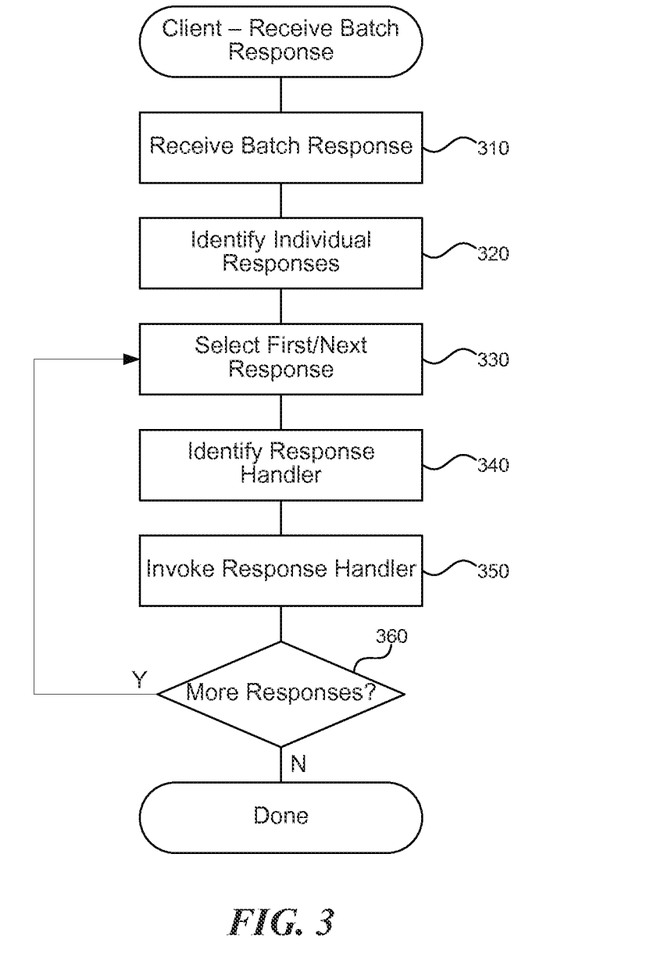
FIG. 3 is a flow diagram that illustrates processing of the request multiplexing system to receive a multiplexed response at a client computer, in one embodiment.

FIG. 3 is a flow diagram that illustrates processing of the request multiplexing system to receive a multiplexed response at a client computer, in one embodiment. Beginning in block 310, the system receives at a client a batch response from a server, wherein the batch response includes individual responses to multiple individual requests previously sent from the client in a batch request. The system receives the batch response in accordance with how the batch request was sent. For example, if the batch request was sent as an HTTP POST, then the batch response is provided as an HTTP response. The client may listen on a particular port for responses, such as port 80 typically used for sending and receiving HTTP over TCP. After a request, the server processes the request and sometime later provides a response over the same (or a related) connection.

Continuing in block 320, the system identifies the individual responses contained within the received batch response. The batch response may include header information or other separating information that delineates where each individual response is contained within the batch response. Thus, the system can enumerate the individual responses, and forward them to the appropriate response handlers as described herein. Although show serially below for ease of explanation, the client may provide individual responses in parallel (i.e., asynchronously) to each waiting client subcomponent that previously initiated a request.

Continuing in block 330, the system selects an identified individual response from the received batch response. The system may loop through the individual responses as shown herein to process each individual response received from the server. Note that the processing of each individual request is not that dramatically different from traditional asynchronous calls (i.e., each component submits a request and receives a response), but how the requests and responses are handled from the time they leave each client component to the time the response is provided to each client component differs substantially. By batching requests and responses, the system allows performance advantages and reduction of resource usage between the client and server without placing undue burdens of code modification and coordination on individual developers that work on each client component.

Continuing in block 340, the system identifies a response handler associated with the selected individual response. The response handler is often provided by the client component making a request as a parameter at the time of the request. The system may then store these handlers for use when the response arrives. Alternatively, to reduce client storage of intermediate information, the system may also transmit handler information in the request to the server that the server echoes back in the response. In other embodiments, the client can infer the appropriate handler based on information associated with the response (e.g., a response type embedded in the response).

Continuing in block 350, the system invokes the identified response handler to handle the selected individual response. The system may provide any parameter information or additional data received with the response for processing by the invoked handler. For example, a request to lookup information in a database may result in a response that includes the information and/or a user interface (e.g., HTML) for displaying the information.

Continuing in decision block 360, if there are more individual responses in the received batch response, then the system loops to block 330 to handle the next individual response, else the system completes. The system continues in this manner until each individual response has been processed by the appropriate handler. After block 360, these steps conclude.

Figure 4:
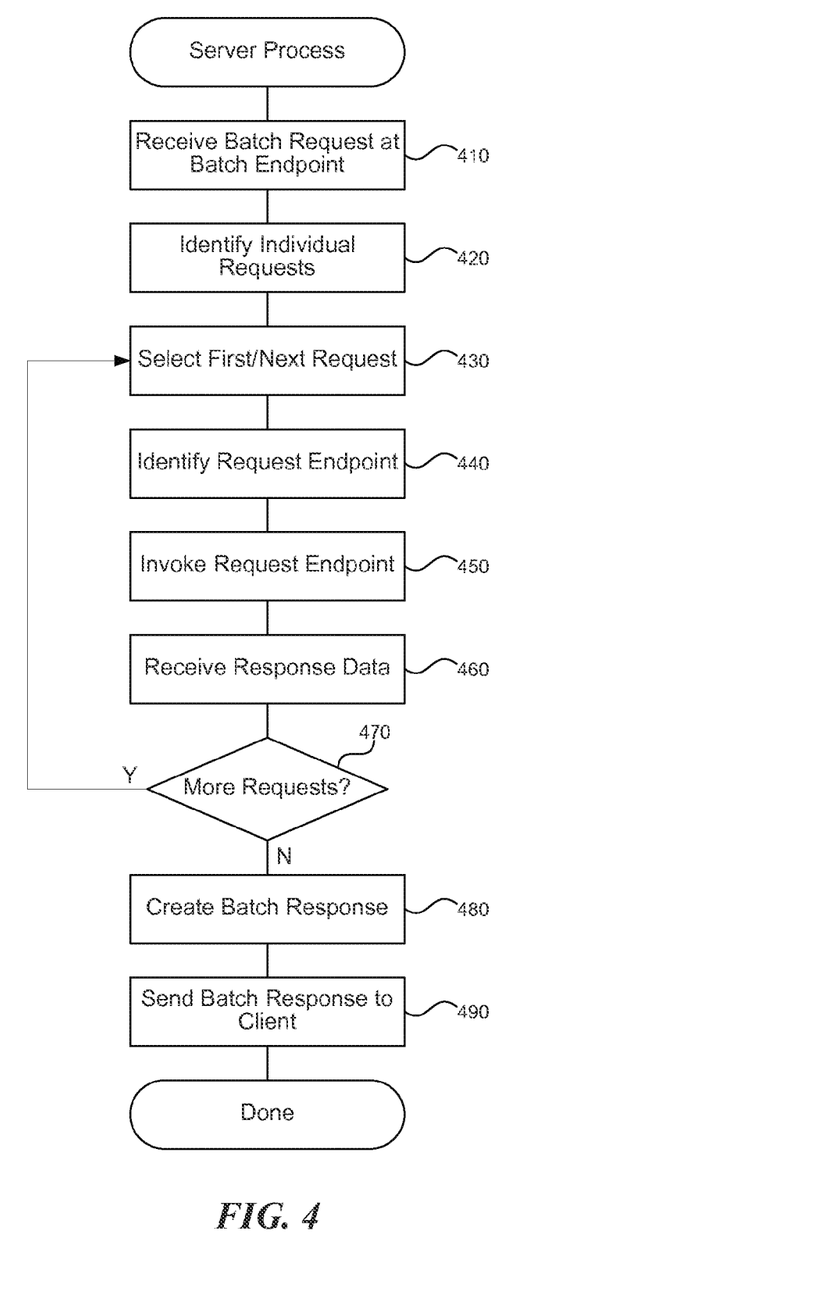
FIG. 4 is a flow diagram that illustrates processing of the request multiplexing system to process a batch request at the server, in one embodiment.

FIG. 4 is a flow diagram that illustrates processing of the request multiplexing system to process a batch request at the server, in one embodiment. Beginning in block 410, the system receives at a server batch endpoint a batch request to handle multiple individual client requests. The server may provide individual endpoints for separate requests as well as a batch endpoint for receiving batch requests. In some cases, clients that need to make only one request may use the individual endpoints, while clients with multiple requests may batch the request and leverage the batch endpoint. The batch endpoint can be designed so that individual developers writing and maintaining individual endpoints need not be aware of or understand the batch process.

Continuing in block 420, the system identifies the individual client requests contained within the batch request. The system may use header information, separation markers, or other delineation within the received batch request to separate out the individual requests contained within the batch request. For example, the batch request may be in XML format and include a hierarchical division between each individual request. If the individual requests are also in XML, then they can fit nicely into such a format. For other implementations of the system, such as those transmitting binary data, header information may include a reference or offset (and potentially length) to each individual request so that the individual requests can be identified at the server.

Continuing in block 430, the system selects each of the individual requests in turn for handling by individual endpoints. Although shown serially, the server may process the requests in parallel or according to other schemes or groupings as appropriate for the performance and other goals of any particular implementation of the system.

Continuing in block 440, the system identifies an endpoint associated with the selected individual request, wherein the endpoint is associated with underlying software logic for processing the individual request and producing a response. The endpoint may include a publicly exposed endpoint, such as that reachable at a web server at a particular URL, or a private endpoint such as that directly callable via a function within the server software code. Even for publicly exposed endpoints, the system may elect to call handling code directly to reduce overhead.

Continuing in block 450, the system invokes the identified endpoint to process the selected request and produce the response. The system may invoke the endpoint by forming an individual request like may traditionally have been sent from the client and directing that request to the endpoint, or by directly invoking internal server logic associated with the endpoint (e.g., a handler function associated with a URL).

Continuing in block 460, the system receives individual response data from the invoked endpoint, and stores the response data for inclusion in a batch response to the client. In some embodiments, the system may provide individual responses to the client even though batch requests are received. Although some web protocols may require matching these two, there is no inherent limitation in the system that prevents the decisions of batching on the client and server from being separate and distinct decisions. Thus, the client may batch when useful for achieving goals of the client, while the server may batch when useful for achieving goals of the server. In addition, some requests may not produce a response, such that multiple requests batched to the server may result in only a single individual response.

Continuing in decision block 470, if there are more requests in the batch request, then the system loops to block 430 to select the next individual request for processing. The system continues in this manner (which may occur in parallel) until each individual request from the client has been processed.

Continuing in block 480, the system creates a batch response to provide responses to the individual requests in a batch to the client. The system accesses the stored response data from the handling of each request to create the batch response, and also builds any header data or other delineation within the batch response so that the client can identify the individual responses related to each request. The server may also include any other requested data received from the client, such as batch identifiers, handling functions, or other information stored and forwarded by the server.

Continuing in block 490, the system sends the batch response from the server to the client. The transmission of the batch response may be in a format that matches that used by the batch request received at the server, or in any other format agreed upon by the client and the server. In some embodiments, the client and server may maintain separate communication channels for sending data for different tasks or purposes. Upon receiving the batch response, the client processes the response in the manner described with reference to FIG. 3. After block 490, these steps conclude.

Figure 5:
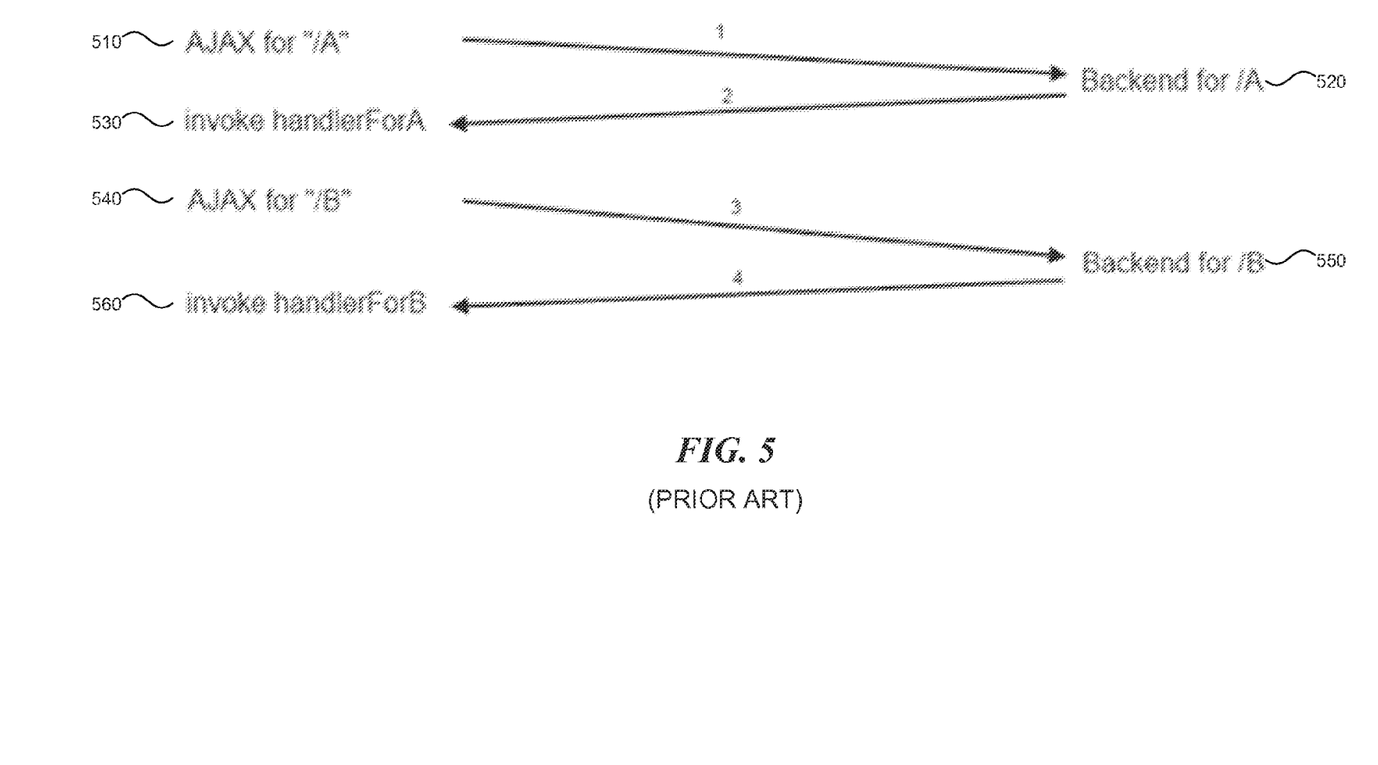
FIG. 5 is a data flow diagram that illustrates the traditional handling of multiple asynchronous requests by a web client and server.

FIG. 5 is a data flow diagram that illustrates the traditional handling of multiple asynchronous requests by a web client and server. The client sends an AJAX request 510 for request A, which is processed by the backend endpoint 520 for requests of type A at the server to produce a response handled by an individual handler 530 at the client. Likewise, the client can send an additional AJAX request 540 for request B, which is processed by the backend endpoint 550 for requests of type B at the server to produce a response handled by an individual handler 560 at the client. Each of these requests and responses are basically independent from each other, though one can back up the others depending on how the client and server communication is designed. Each request involves a separate transmission from the client to the server and each response involves a separate transmission from the server to the client.

Figure 6:
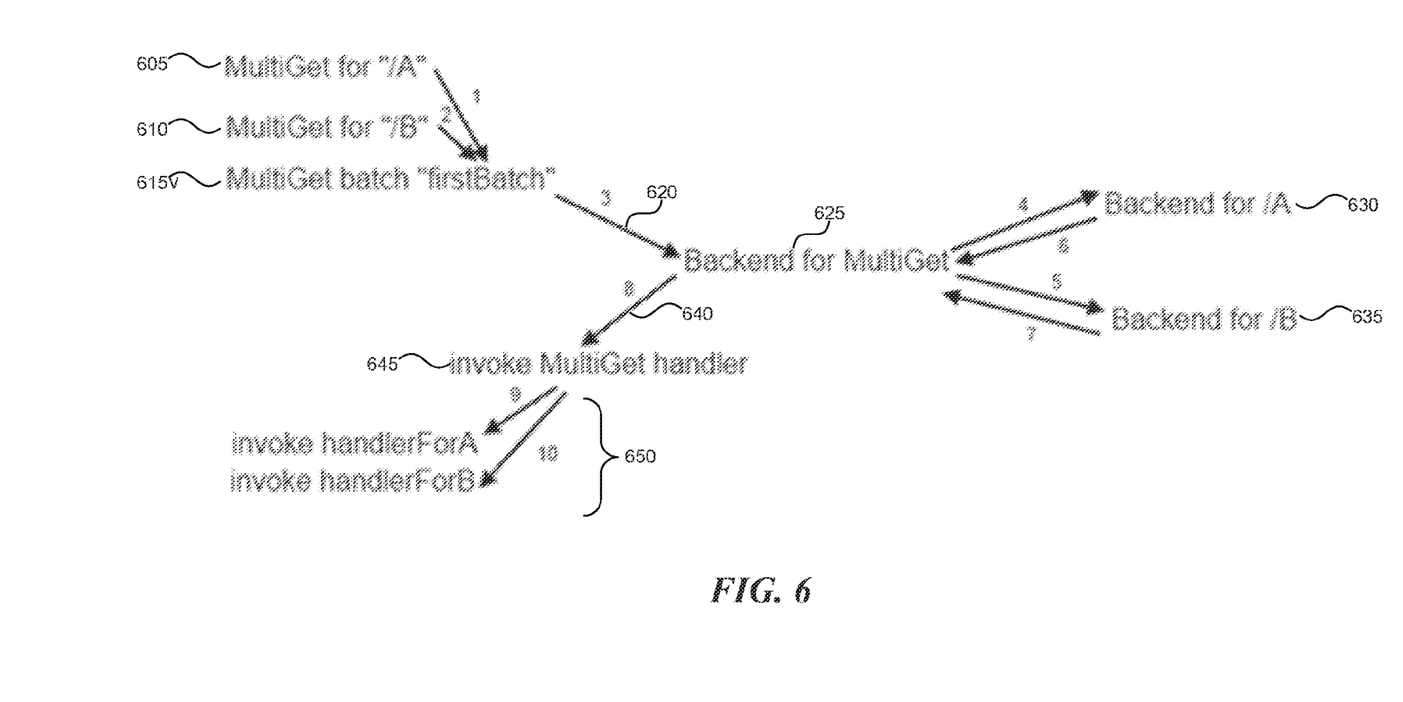
FIG. 6 is a data flow diagram that illustrates handling of multiple asynchronous requests by the request multiplexing system, in one embodiment.

FIG. 6 is a data flow diagram that illustrates handling of multiple asynchronous requests by the request multiplexing system, in one embodiment. A client receives a first request 605 and a second request 610, which the client holds until the completion command 615 indicates that a batch is complete or otherwise ready to send to the server. A single request transmission 620 goes from the client to the server carrying the batch request. A batch handling endpoint 625 at the server receives the request transmission 620, sends the first request 605 to a first backend handler 630, and sends the second request 610 to a second backend handler 635. The backend then provides a unified batch response 640 with individual responses from each backend handler. The client provides a batch handler 645 for handling batched responses, and separates out the individual responses for provision to individual client handlers 650. Thus, in contrast to FIG. 5, there is only a single transmission of the request from the client to the server, and a single response from the server to the client.

From the foregoing, it will be appreciated that specific embodiments of the request multiplexing system have been described herein for purposes of illustration, but that various modifications may be made without deviating from the spirit and scope of the invention. Accordingly, the invention is not limited except as by the appended claims.

We claim:

1. A computer system for multiplexing web requests for improved performance, the system comprising:
   at least one memory and at least one processor, the at least one processor configured to execute software instructions embodied within the following components;
   a request receiving component that operates at a client computer to receive from a subcomponent of a web-based application a first request for a first response of a plurality of requests for responses and a second request for a second response of the plurality of requests for responses, the first and second requests identifying first and second server endpoints respectively capable of providing the first and second responses;
   a request multiplexing component that operates client computer and that creates a multiplexed request that includes the first and second requests;
   a server communication component that operates at a client computer and that handles communication of the multiplexed request over a network to a third single server endpoint coupled to the first and second server endpoints; and
   a response demultiplexing component that operates at a client computer and that divides a received single response from the third single server endpoint into the first and second responses.

2. The system of claim 1 wherein the request receiving component includes a client-side script library that includes a request to retrieve data from a server associated with the web-based application by batching multiple asynchronous client requests in one batch request.

3. The system of claim 1 wherein the request receiving component receives with the request information identifying a handler function on the client to be called to handle the server's response to the request.

4. The system of claim 1 wherein the request multiplexing component creates a batch request that includes request data from each of the received individual requests.

5. The system of claim 1 wherein the request multiplexing component provides an interface for receiving an instruction at the client to submit a batch of waiting requests, and upon receiving the instruction creates the batch request for sending to the server.

6. The system of claim 1, further comprising a batch identification component that determines that the received first and second requests should be included in a first single batch request and that the first single batch should exclude the other requests of the plurality of requests for responses.

7. The system of claim 6 wherein the batch identification component receives a batch identifier from each caller that submits requests, and then batches together those requests that have a matching batch identifier.

8. A computer system for multiplexing web requests for improved performance, the system comprising:
   at least one memory and at least one processor, the at least one processor configured to execute software instructions embodied within the following components;
   a request receiving component that operates at a client computer to receive from a subcomponent of a web-based application a first request for a first response of a plurality of requests for responses and a second request for a second response of the plurality of requests for responses, the first and second requests identifying first and second server endpoints respectively capable of providing the first and second responses;
   a request multiplexing component that operates at a client computer and that creates a multiplexed request that includes the first and second requests;
   a third single server endpoint coupled to the first and second server endpoints;
   a server communication component that operates at a client computer and that handles communication of the multiplexed request over a network to the third single server endpoint; and
   a response demultiplexing component that operates at a client computer and that divides a received single response from the third single server endpoint into the first and second responses.

9. The system of claim 8, further comprising a batch identification component that determines that the received first and second requests should be included in a first single batch request and that the first single batch should exclude the other requests of the plurality of requests for responses.

10. The system of claim 9 wherein the batch identification component receives a batch identifier from each caller that submits requests, and then batches together those requests that have a matching batch identifier.

* * * * *